US011299152B2

(12) United States Patent
Ishioka

(10) Patent No.: US 11,299,152 B2
(45) Date of Patent: Apr. 12, 2022

(54) VEHICLE CONTROL SYSTEM, VEHICLE CONTROL METHOD, AND STORAGE MEDIUM

(71) Applicant: HONDA MOTOR CO., LTD., Tokyo (JP)

(72) Inventor: Atsushi Ishioka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 330 days.

(21) Appl. No.: 16/471,640

(22) PCT Filed: Dec. 27, 2016

(86) PCT No.: PCT/JP2016/088934
§ 371 (c)(1),
(2) Date: Jun. 20, 2019

(87) PCT Pub. No.: WO2018/122973
PCT Pub. Date: Jul. 5, 2018

(65) Prior Publication Data
US 2020/0122722 A1    Apr. 23, 2020

(51) Int. Cl.
*B60W 30/12* (2020.01)
*B60W 10/20* (2006.01)
(Continued)

(52) U.S. Cl.
CPC ............ *B60W 30/12* (2013.01); *B60W 10/20* (2013.01); *B60W 30/18163* (2013.01);
(Continued)

(58) Field of Classification Search
CPC ............... B60W 30/12; B60W 10/20; B60W 30/18163; B60W 50/14; B60W 2520/10; G05D 1/0088; G05D 2201/0213
See application file for complete search history.

(56) References Cited

U.S. PATENT DOCUMENTS

| 2014/0207325 | A1 | 7/2014 | Mudalige et al. |
| 2017/0240176 | A1* | 8/2017 | Aoki ............... G08G 1/167 |
| 2019/0329780 | A1* | 10/2019 | Tomescu ........... B60W 30/09 |

FOREIGN PATENT DOCUMENTS

| JP | 2007-155342 | 6/2007 |
| JP | 2008-039501 | 2/2008 |

(Continued)

OTHER PUBLICATIONS

Japanese Office Action for Japanese Patent Application No. 2018-558574 dated Jan. 7, 2020.
(Continued)

*Primary Examiner* — Michael D Lang
(74) *Attorney, Agent, or Firm* — Amin, Turocy & Watson, LLP

(57) ABSTRACT

A vehicle control system includes: a recommended lane setter configured to set a recommended lane in which an own vehicle is to travel along a route to a destination; a reception unit configured to receive an operation by an occupant of the own vehicle; and an automatic driving controller configured to control steering and acceleration or deceleration of the own vehicle such that the own vehicle travels in the recommended lane set by the recommended lane setter. The automatic driving controller is configured to change a lane of the own vehicle to another lane different from the recommended lane and is configured to control the steering and the acceleration or deceleration speed of the own vehicle such that the traveling in a lane of a lane change destination is maintained until a predetermined condition is satisfied when the reception unit receives a predetermined operation.

10 Claims, 12 Drawing Sheets

(51) Int. Cl.
    *B60W 30/18* (2012.01)
    *B60W 50/14* (2020.01)
    *G05D 1/00* (2006.01)
(52) U.S. Cl.
    CPC ........... *B60W 50/14* (2013.01); *G05D 1/0088* (2013.01); *B60W 2520/10* (2013.01); *G05D 2201/0213* (2013.01)

(56) References Cited

FOREIGN PATENT DOCUMENTS

| | | |
|---|---|---|
| JP | 2014-065466 | 4/2014 |
| JP | 2015-145849 | 8/2015 |
| JP | 2015-152386 | 8/2015 |
| JP | 2016-009200 | 1/2016 |
| JP | 2016-071513 | 5/2016 |
| JP | 2016-071514 | 5/2016 |
| WO | 2015-190212 | 12/2015 |

OTHER PUBLICATIONS

International Search Report and Written Opinion for International Application No. PCT/JP2016/088934 dated Mar. 21, 2017, 11 pgs.

\* cited by examiner

|  | NUMBER OF INSTRUCTIONS TO CHANGE LANE TO OTHER LANES | PREDETERMINED TIME/ PREDETERMINED DISTANCE |
|---|---|---|
| OCCUPANT ID | 10TIMES | 10MINUTES/13km |
| OCCUPANT A | 20TIMES | 20MINUTES/26km |
| OCCUPANT B | 1TIMES | 1MINUTES/1.3km |
| OCCUPANT C | ... | ... |

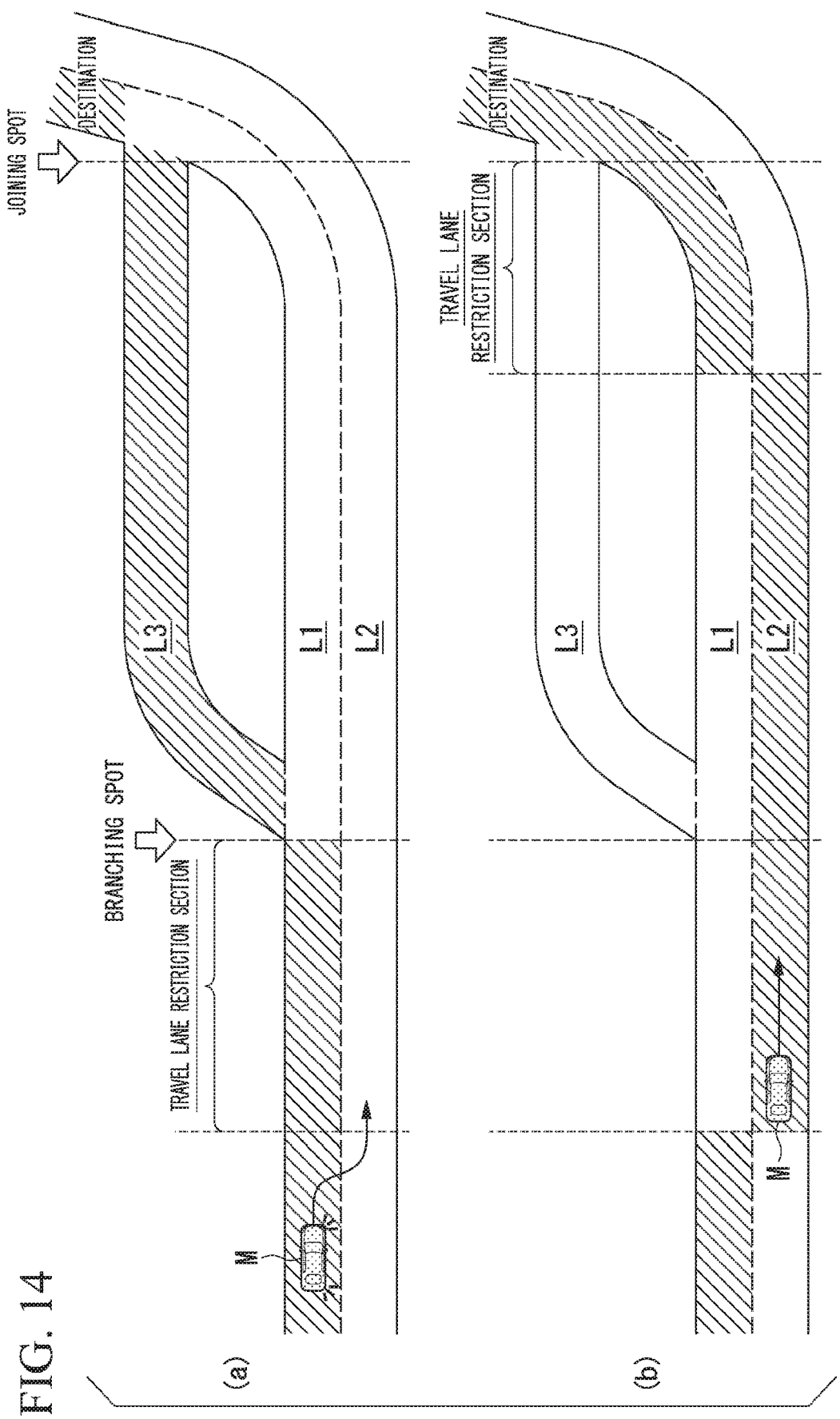

VEHICLE CONTROL SYSTEM, VEHICLE CONTROL METHOD, AND STORAGE MEDIUM

TECHNICAL FIELD

The present invention relates to a vehicle control system, a vehicle control method, and a storage medium.

BACKGROUND ART

In the related art, a technology for supporting a change in a lane through a lever operation or the like of an indicator by a driver is known (for example, Patent Document 1).

CITATION LIST

Patent Literature

[Patent Document 1]
Japanese Unexamined Patent Application, First Publication No. 2016-71514

SUMMARY OF INVENTION

Technical Problem

However, the technology of the related art has a structure in which an occupant approves a lane change suggestion from the vehicle. When a lane is changed according to a suggestion from an occupant, a plan for subsequent automatic driving is not considered.

The present invention is devised in view of such circumstances and one object of the present invention is to provide a vehicle control system, a vehicle control method, and a vehicle control program capable of smoothly performing automatic driving control after a lane change according to an instruction from an occupant.

Solution to Problem

According to the present invention of a first aspect, there is provided a vehicle control system including: a recommended lane setter configured to set a recommended lane in which an own vehicle is to travel along a route to a destination; a reception unit configured to receive an operation by an occupant of the own vehicle; and an automatic driving controller configured to control steering and acceleration or deceleration of the own vehicle such that the own vehicle travels in the recommended lane set by the recommended lane setter. The automatic driving controller is configured to change a lane of the own vehicle to another lane different from the recommended lane and is configured to control the steering and the acceleration or deceleration speed of the own vehicle such that the traveling in a lane of a lane change destination is maintained until a predetermined condition is satisfied when the reception unit receives a predetermined operation.

According to the present invention of a second aspect, in the vehicle control system according to the first aspect, the predetermined condition may be that the recommended lane setter is configured to set the recommended lane in a branching lane branched from a main lane and the own vehicle approaches a branching spot in which the branching lane branches from the main lane.

According to the present invention of a third aspect, in the vehicle control system according to the first aspect, the predetermined condition may be that the own vehicle passes a preceding vehicle before a lane change of the own vehicle in a state in which the lane is changed.

According to the present invention of a fourth aspect, in the vehicle control system according to the first aspect, the predetermined condition may be that the own vehicle passes an obstacle before a lane change of the own vehicle in a state in which the lane is changed.

According to the present invention of a fifth aspect, in the vehicle control system according to the first aspect, the predetermined condition may be that a following vehicle behind the own vehicle approaches the own vehicle in a state in which the lane is changed.

According to the present invention of a sixth aspect, in the vehicle control system according to the fourth aspect 1, the predetermined condition may be that the reception unit receives a predetermined operation in a state in which the lane is changed.

According to the present invention of a seventh aspect, in the vehicle control system according to the first aspect, the recommended lane setter may set a lane following the branching lane as a recommended lane among lanes of a main lane in a section which is a predetermined distance in front of a branching spot in which a branching lane branches from the main lane. The automatic driving controller may not change a lane to return to the lane before the lane change when the own vehicle travels in the same lane as the recommended lane in the section in the future as a result of the lane change to the other lane.

According to the present invention of an eighth aspect, the vehicle control system according to the first aspect may further include an occupant recognizer configured to recognize an occupant of the own vehicle. The automatic driving controller may continue the control of the steering and the acceleration or deceleration of the own vehicle such that the own vehicle travels in the other lane until a time provided by the occupant recognized by the occupant recognizer passes or until the own vehicle travels a distance provided by the occupant after the lane change to the other lane. After the time or the distance passes, the lane of the own vehicle may be changed from the other lane to the lane before the lane change.

According to the present invention of a ninth aspect, there is provided a vehicle control system including: an acquirer configured to acquire a route to a destination; a recommended lane setter configured to set a recommended lane in which an own vehicle is to travel along a route to a destination acquired by the acquirer; a reception unit configured to receive an operation by an occupant of the own vehicle; and an automatic driving controller configured to control steering and acceleration or deceleration of the own vehicle such that the own vehicle travels in the recommended lane set by the recommended lane setter. The automatic driving controller is configured to change a lane of the own vehicle to another lane different from the recommended lane when the reception unit receives a predetermined operation. The acquirer is configured to re-acquire the route as the lane of the own vehicle is changed by the automatic driving controller.

According to the present invention of a tenth aspect, in the vehicle control system according to the ninth aspect, the automatic driving controller the tenth aspect may control the steering and the acceleration or deceleration of the own vehicle such that a lane of a destination to which the lane is changed is maintained until a predetermined condition is satisfied.

According to the present invention of an eleventh aspect, there is provided a vehicle control method causing an on-board computer to perform: setting a recommended lane in which an own vehicle is to travel along a route to a destination; receiving an operation by an occupant of the own vehicle; controlling steering and acceleration or deceleration of the own vehicle such that the own vehicle travels in the set recommended lane; and changing a lane of the own vehicle to another lane different from the recommended lane and controlling the steering and the acceleration or deceleration of the own vehicle such that the traveling in a lane of a lane change destination is maintained until a predetermined condition is satisfied when a predetermined operation is received.

According to the present invention of a twelfth aspect, there is provided a computer-readable non-transitory storage medium storing a vehicle control program causing an on-board computer to perform: setting a recommended lane in which an own vehicle is to travel along a route to a destination; receiving an operation by an occupant of the own vehicle; controlling steering and acceleration or deceleration speed of the own vehicle such that the own vehicle travels in the set recommended lane; and changing a lane of the own vehicle to another lane different from the recommended lane and controlling the steering and the acceleration or deceleration speed of the own vehicle such that the traveling in a lane of a lane change destination is maintained until a predetermined condition is satisfied when a predetermined operation is received.

Advantageous Effects of Invention

According to the present invention described in each aspect, a recommended lane in which an own vehicle is to travel along a route to a destination is set, an operation by an occupant of the own vehicle is received; and steering and acceleration or deceleration of the own vehicle is controlled such that the own vehicle travels in the recommended lane set by the recommended lane setter. A lane of the own vehicle is changed to another lane different from the recommended lane and the steering and the acceleration or deceleration speed of the own vehicle are controlled such that the traveling in a lane of a lane change destination is maintained until a predetermined condition is satisfied when the reception unit receives a predetermined operation. Therefore, it is possible to control automatic driving further smoothly after the lane is changed through an instruction from the occupant.

BRIEF DESCRIPTION OF DRAWINGS

FIG. 14 is a diagram showing an example of a scenario in which a route is changed.

DESCRIPTION OF EMBODIMENTS

Hereinafter, embodiments of a vehicle control system, a vehicle control method, and a vehicle control program of the present invention will be described with reference to the drawings.

First Embodiment

Figure 1:
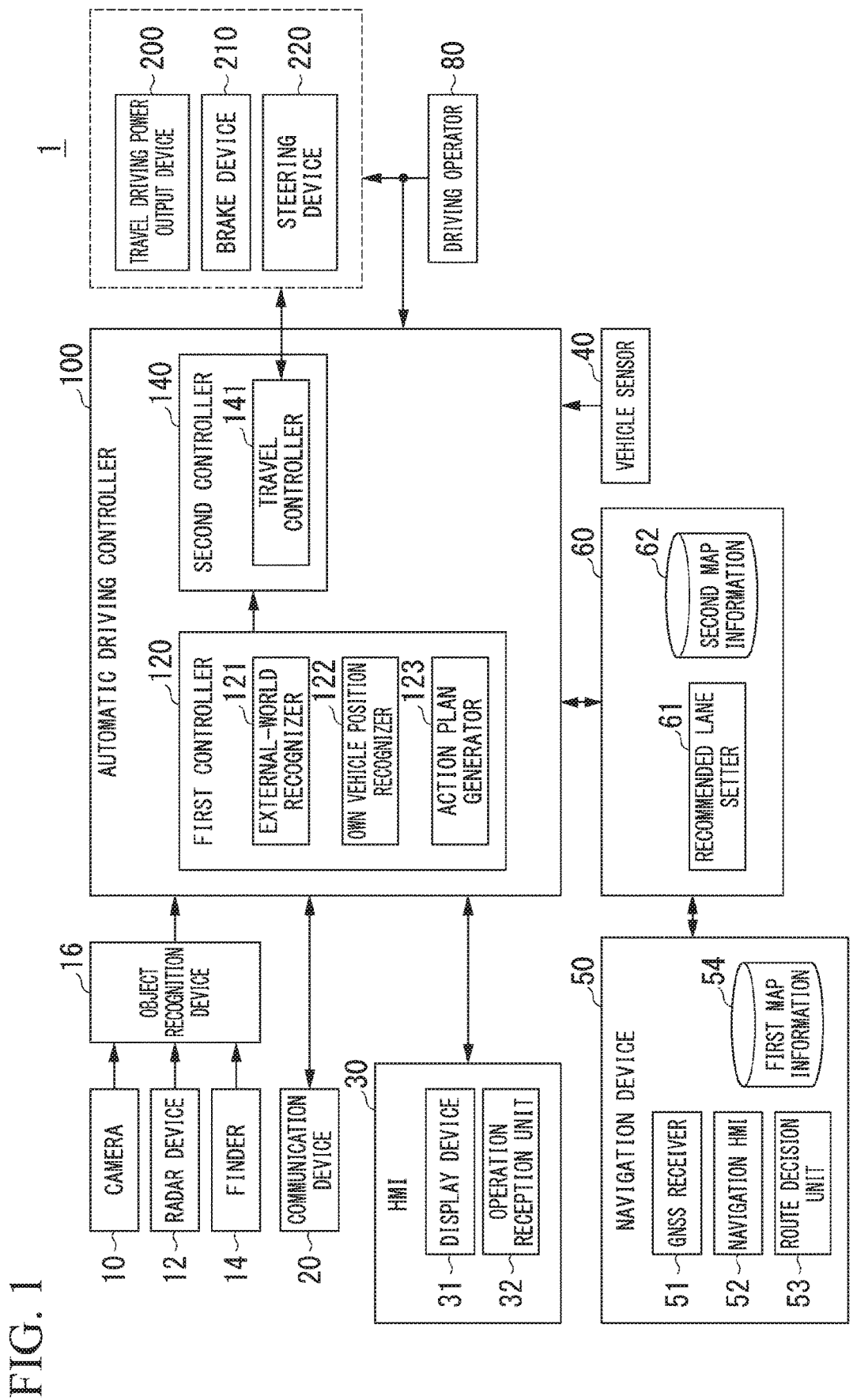
FIG. 1 is a diagram showing a configuration of a vehicle control system 1 according to a first embodiment.

FIG. 1 is a diagram showing a configuration of a vehicle control system 1 according to a first embodiment. A vehicle on which the vehicle control system 1 is mounted is, for example, a vehicle such as a two-wheeled vehicle, a three-wheeled vehicle, or a four-wheeled vehicle. A driving source of the vehicle includes an internal combustion engine such as a diesel engine or a gasoline engine, an electric motor, and a combination thereof. The electric motor operates using power generated by a power generator connected to the internal combustion engine or power discharged from a secondary cell or a fuel cell.

The vehicle control system 1 includes, for example, a camera 10, a radar device 12, a finder 14, an object recognition device 16, a communication device 20, a human machine interface (HMI) 30, a vehicle sensor 40, a navigation device 50, a micro processing unit (MPU) 60, a driving operator 80, an automatic driving controller 100, a travel driving power output device 200, a brake device 210, and a steering device 220. The devices and units are connected to each other via a multiplex communication line such as a controller area network (CAN) communication line, a serial communication line, or a wireless communication network. The configuration shown in FIG. 1 is merely an exemplary example, a part of the configuration may be omitted, and another configuration may be further added.

The camera 10 is, for example, a digital camera that uses a solid-state image sensor such as a charged coupled device (CCD) or a complementary metal oxide semiconductor (CMOS). The single camera 10 or the plurality of cameras 10 are mounted on any portion of the vehicle in which the vehicle control system 1 is mounted (hereinafter referred to as an own vehicle M). In the case of forward imaging, the camera 10 is mounted on an upper portion of a front windshield, a rear surface of a rearview mirror, or the like. For example, the camera 10 repeatedly images the periphery of the own vehicle M periodically. The camera 10 may be a stereo camera.

The radar device 12 radiates radio waves such as millimeter waves to the periphery of the own vehicle M and detects radio waves (reflected waves) reflected from an object to detect at least a position (a distance and an azimuth) of the object. The single radar device 12 or the plurality of radar devices 12 are mounted on any portion of the own vehicle M. The radar device 12 may detect a position and a speed of an object in conformity with a frequency modulated continuous wave (FMCW) scheme.

The finder 14 is a light detection and ranging or a laser imaging detection and ranging (LIDAR) finder that measures scattered light of radiated light and detects a distance to a target. The single finder 14 or the plurality of finders 14 are mounted on any portion of the own vehicle M.

The object recognition device 16 performs a sensor fusion process on detection results from some or all of the camera 10, the radar device 12, and the finder 14 and recognizes the position, the type, the speed, and the like of an object. The object recognition device 16 outputs a recognition result to the automatic driving controller 100.

The communication device 20 communicates with other vehicles around the own vehicle M (an example of a peripheral vehicle) using, for example, a cellular network, a Wi-Fi network, Bluetooth (registered trademark), dedicated short range communication (DSRC), or the like or communicates with various server devices via wireless base stations.

The HMI 30 suggests various types of information to occupants of the own vehicle M and receives input operations by the occupants. For example, the HMI 30 includes a display device 31 and an operation reception unit 32.

The display device 31 is, for example, a liquid crystal display (LCD), an organic electro-luminescence (EL) display device, or the like and is mounted in each unit of an instrument panel or any portion of an assistant seat or a back seat. The display device 31 is a touch panel with which the operation reception unit 32 to be described below is integrated.

The operation reception unit 32 receives, for example, an instruction operation to change a lane as one of the operations input by occupants. An instruction operation to change a line is an example of a "predetermined operation."

The operation reception unit 32 is, for example, an operation lever of a direction indicator provided near a steering wheel. For example, when the operation lever provided on the right side of the steering wheel from the viewpoint of an occupant is operated, the operation reception unit 32 receives the operation as an instruction operation of changing a lane of the own vehicle M to a right adjacent lane. When the operation lever provided on the left side of the steering wheel from the viewpoint of the occupant is operated, the operation reception unit 32 receives the operation as an instruction operation to change lanes of the own vehicle M to a left adjacent lane. The operation reception unit 32 may be a switch, an input key, or the like. The operation reception unit 32 generates an operation input signal based on the received input operation and outputs the operation input signal to the automatic driving controller 100.

The vehicle sensor 40 includes a vehicle speed sensor that detects a speed of the own vehicle M, an acceleration sensor that detects acceleration, a yaw rate sensor that detects an angular velocity around a vertical axis, and an azimuth sensor that detects a direction of the own vehicle M. The vehicle sensor 40 outputs the detected information (a speed, acceleration, an angular velocity, an azimuth, or the like) to the automatic driving controller 100.

The navigation device 50 includes, for example, a global navigation satellite system (GNSS) receiver 51, a navigation HMI 52, and a route decision unit 53 and retains first map information 54 in a storage device such as a hard disk drive (HDD) or a flash memory. The navigation device 50 is an example of an "acquirer."

The GNSS receiver 51 specifies a position of the own vehicle M based on signals received from GNSS satellites. The position of the own vehicle M may be specified or complemented by an inertial navigation system (INS) using an output of the vehicle sensor 40.

The navigation HMI 52 includes a display device, a speaker, a touch panel, and a key. The navigation HMI 52 may be partially or entirely common to the above-described HMI 30.

The route decision unit 53 decides, for example, a route from a position of the own vehicle M specified by the GNSS receiver 51 (or any input position) to a destination input by an occupant using the navigation HMI 52 with reference to the first map information 54. The first map information 54 is, for example, information in which a road form is expressed by links indicating roads and nodes connected by the links. The first map information 54 may include curvatures of roads and point of interest (POI) information. The route decided by the route decision unit 53 is output to the MPU 60.

The navigation device 50 may perform route guidance using the navigation HMI 52 based on the route decided by the route decision unit 53. The navigation device 50 may be realized by, for example, a function of a terminal device such as a smartphone or a tablet terminal possessed by a user. The navigation device 50 may transmit a current position and a destination to a navigation server via the communication device 20 to acquire a route replied from the navigation server.

The MPU 60 functions as, for example, a recommended lane setter 61 and retains second map information 62 in a storage device such as an HDD or a flash memory. The recommended lane setter 61 divides a route provided from the navigation device 50 into a plurality of blocks (for example, divides the route in a vehicle movement direction for each 100 [m]) and sets a recommended lane in which the own vehicle M is to travel for each block with reference to the second map information 62.

For example, when a route provided from the navigation device 50 has a plurality of lanes, the recommended lane setter 61 sets any one lane among one or more lanes included in each block as a recommended lane for each block. When there is a branching spot, a joining spot, or the like on the provided route, the recommended lane setter 61 sets a recommended lane so that the own vehicle M can travel along a reasonable travel route for moving to a branching destination on that spot. For example, when a destination is on an extended line branching from a main line including a plurality of lanes, the recommended lane setter 61 sets a lane directed to a lane of a branching destination (branching lane) as a recommended lane among the lanes included in the main lane. At this time, the recommended lane is set to a lane following a branching lane (a lane adjacent to the branching lane) among the plurality of lanes included in the main lane which is a predetermined distance in front of the branching spot (hereinafter referred to as a travel lane restriction section). The travel lane restriction section is set with, for example, a distance (for example, about 2 [km]) in which a margin is allowed up to a branching spot for changing a lane. In the travel lane restriction section, a lane is prohibited from being changed to a lane different from a recommended lane. The travel lane restriction section may be set as a section that continues when own vehicle M travels for a predetermined time.

The second map information 62 is map information with higher precision than the first map information 54. The second map information 62 includes, for example, information regarding the middles of lanes or information regarding boundaries of lanes. The second map information 62 may include road information, traffic regulation information, address information (address and postal number), facility information, and telephone number information. The road information includes information indicating kinds of roads such as expressways, roll roads, national ways, or prefecture roads and information such as the number of lanes of a road, the width of each lane, the gradients of roads, the positions of roads (3-dimensional coordinates including longitude, latitude, and height), curvatures of curves of lanes, positions of joining and branching spots of lanes, and signs installed on roads. The second map information 62 may be updated frequently when the communication device 20 is used to access other devices.

The driving operator 80 includes, for example, an accelerator pedal, a brake pedal, a shift lever, and a steering wheel. For example, the steering wheel may receive an instruction operation of changing a lane obtained from the operation reception unit 32. A sensor that detects whether there is an operation or an operation amount is mounted on the driving operator 80 and a detection result is output to the automatic driving controller 100 or some or all of the travel driving power output device 200, the brake device 210, and the steering device 220.

The automatic driving controller 100 includes, for example, a first controller 120 and a second controller 140. Each of the first controller 120 and the second controller 140 is realized, for example, by causing a processor such as a central processing unit (CPU) to execute a program (software). Some or all of the constituent elements of the first controller 120 and the second controller 140 may be realized by hardware such as a large scale integration (LSI), an application specific integrated circuit (ASIC), or a field-programmable gate array (FPGA), or may be realized by software and hardware in cooperation.

The first controller 120 includes, for example, an external-world recognizer 121, an own vehicle position recognizer 122, and an action plan generator 123.

The external-world recognizer 121 recognizes states such as positions of peripheral vehicles and speeds, acceleration, or the like thereof based on information input from the camera 10, the radar device 12, and the finder 14 via the object recognition device 16. The peripheral vehicles are, for example, vehicles traveling near the own vehicle M and vehicles traveling in the same direction as the own vehicle M. The peripheral vehicle is, for example, a preceding vehicle traveling immediately in front of the own vehicle M in the own lane. The preceding vehicles may be vehicles stopping in front of the own vehicle M. The positions of the peripheral vehicles may be represented as representative points such as centers, corners, or the like of the peripheral vehicles or may be represented as regions expressed by contours of the peripheral vehicles. The "states" of the peripheral vehicles may include acceleration or jerk of the peripheral vehicles or "action states" (for example, whether the peripheral vehicles are changing their lanes or are attempting to change their lanes). The external-world recognizer 121 may recognize a position of a falling object on a roadway, a guardrail, an electric pole, a parked vehicle, a pedestrian, a mark on the surfaces of roads, a sign, and another object in addition to the peripheral vehicle.

The own vehicle position recognizer 122 recognizes, for example, a lane in which the own vehicle M is traveling (an own lane) and a relative position and an attitude of the own vehicle M with respect to the own lane. The own vehicle position recognizer 122 recognizes, for example, the own lane by comparing patterns of road mark lines (for example, arrangement of continuous lines and broken lines) obtained from the second map information 62 with patterns of road mark lines around the own vehicle M recognized from images captured by the camera 10. In this recognition, the position of the own vehicle M acquired from navigation device 50 or a process result by INS may be added.

Figure 2:
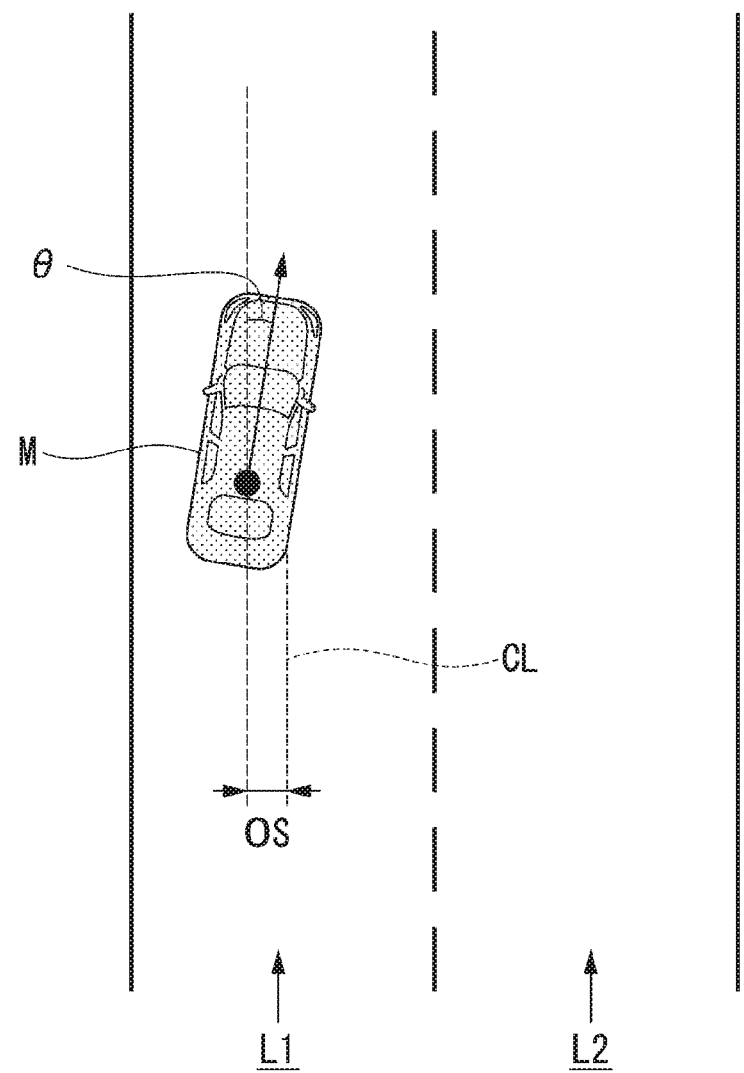
FIG. 2 is a diagram showing an aspect in which a relative position and an attitude of the own vehicle M with respect to an own lane L1 are recognized by an own vehicle position recognizer 122.

Then, the own vehicle position recognizer 122 recognizes, for example, a position or an attitude of the own vehicle M with respect to an own lane. FIG. 2 is a diagram showing an aspect in which a relative position and an attitude of an own vehicle M with respect to an own lane L1 are recognized by the own vehicle position recognizer 122. The own vehicle position recognizer 122 recognizes, for example, a separation OS from an own lane center CL of a reference point (for example, a center) of the own vehicle M and an angle θ formed with respect to a line drawn with the own lane center CL in the movement direction of the own vehicle M as the relative position and the attitude of the own vehicle M with respect to the own lane L1. Instead of this, the own vehicle position recognizer 122 may recognize a position or the like of the reference point of the own vehicle M with respect to one side end of the own lane L1 as the relative position of the own vehicle M with respect to the own lane. The relative position of the own vehicle M recognized by the own vehicle position recognizer 122 is supplied to the action plan generator 123.

The action plan generator 123 generates an action plan so that the own vehicle M travels in the recommended lane decided by the recommended lane setter 61 and peripheral situations of the own vehicle M can be handled. The action plan includes events which are performed in sequence in automatic driving. The automatic driving refers to control of at least one of steering and an accelerated or decelerated speed of the own vehicle M by the automatic driving controller 100.

The events includes, for example, a constant speed traveling event for traveling at a constant speed in the same travel lane, a following travel event for following a preceding vehicle, a lane change event for changing a travel lane, and an passing event for passing a preceding vehicle. For example, the passing event is planed under a situation in which a speed of a preceding vehicle is slower by a given speed or more than a speed of the own vehicle M and an average speed or the like of a peripheral vehicle traveling in an adjacent lane which is adjacent to the own lane is faster than a speed of the own vehicle M by a given speed or more. For example, when the passing event is performed, the own vehicle M temporarily moves to an adjacent lane by changing lanes and moves to the own lane (the original lane) before the lane change by changing lanes in accordance with acceleration or the like.

The events includes a joining event for accelerating or decelerating the own vehicle M in a joining lane for joining to the main lane and changing a traveling lane to the joining lane, a branching event for changing a lane of the own vehicle M to a lane of a branching destination at a branching spot, an emergency stop event for emergently stopping the own vehicle M in accordance with a behavior of a peripheral vehicle or the like, and a switching event for ending automatic driving and switching to manual driving (a takeover event). The manual driving refers to control of the travel driving power output device 200, the brake device 210, and the steering device 220 through an operation on the driving operator 80 by an occupant. While such an event is being performed, an event for avoidance is planed based on a peripheral situation of the own vehicle M (an obstacle of a roadway, a peripheral vehicle, presence of a pedestrian, contraction of a lane due to road construction, or the like) of the own vehicle M in some cases.

The action plan generator 123 generates a target trajectory along which the own vehicle M travels in future. The target trajectory is expressed by sequentially arranging target spots (trajectory points) at which the own vehicle M arrives. The trajectory points are spots at which the own vehicle M arrives for each predetermined travel distance, and a target speed and target acceleration for each predetermined sampling time (for example, about 0 decimal point [sec]) are generated as parts of the target trajectory apart from the spots. The trajectory point may be a position at each predetermined sampling time at which the own vehicle M arrives at that sampling time. In this case, information regarding target speed or target acceleration is expressed at intervals of the trajectory points.

Figure 3:
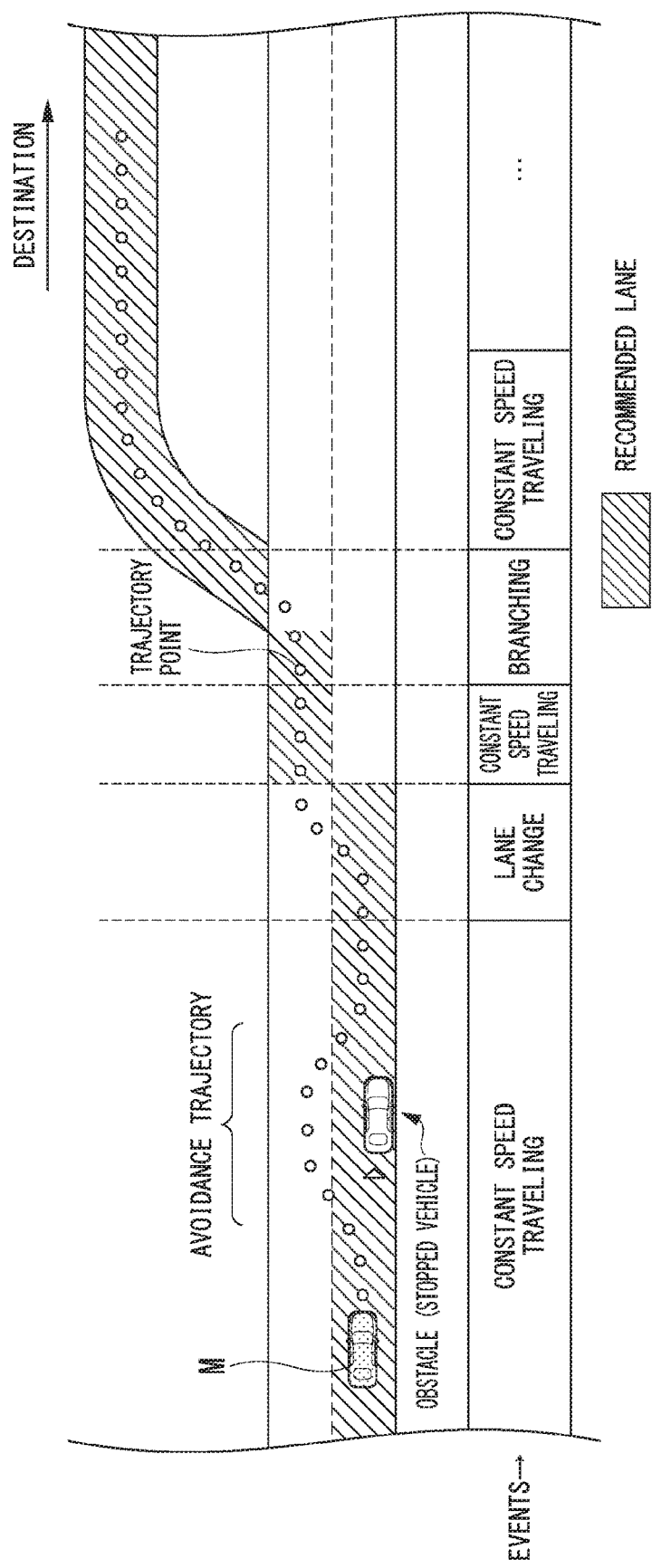
FIG. 3 is a diagram showing an aspect in which a target trajectory is generated based on a recommended lane.

FIG. 3 is a diagram showing an aspect in which a target trajectory is generated based on a recommended lane. As shown, the recommended lane is set so that it is convenient to travel along a route to a destination. Upon coming within a predetermined distance in front of a switching spot of the recommended lane, the action plan generator 123 activates a lane change event, a branching event, a joining event, or the like. The predetermined distance in front of the switching spot of the recommended lane may be decided in accordance with the type of the event. When it is necessary to avoid an obstacle during execution (activation) of each event, the action plan generator 123 may generate a trajectory for avoidance or may generate a trajectory for deceleration to stop the own vehicle M in front of an obstacle, as shown.

For example, the action plan generator 123 generates a plurality of candidates for the target trajectory and selects an optimum target trajectory at that time based on the perspective of safety and efficiency.

The second controller 140 includes a travel controller 141. The travel controller 141 controls the travel driving power output device 200, the brake device 210, and the steering device 220 so that the own vehicle M passes through the target trajectory generated by the action plan generator 123 at a scheduled time. The action plan generator 123 and the travel controller 141 are an example of an "automatic driving controller."

The travel driving power output device 200 outputs travel driving power (torque) for traveling the vehicle to a driving wheel. The travel driving power output device 200 includes, for example, a combination of an internal combustion engine, an electric motor and a transmission, and an electronic controller (ECU) controlling these units. The ECU controls the foregoing configuration in accordance with information input from the travel controller 141 or information input from the driving operator 80.

The brake device 210 includes, for example, a brake caliper, a cylinder that transmits a hydraulic pressure to the brake caliper, an electronic motor that generates a hydraulic pressure in the cylinder, and a brake ECU. The brake ECU controls the electric motor in accordance with information input from the travel controller 141 such that a brake torque in accordance with a brake operation is output to each wheel. The brake device 210 may include a mechanism that transmits a hydraulic pressure generated in response to an operation of the brake pedal included in the driving operator 80 to the cylinder via a master cylinder as a backup. The brake device 210 is not limited to the above-described configuration and may be an electronic control type hydraulic brake device that controls an actuator in accordance with information input from the travel controller 141 such that a hydraulic pressure of the master cylinder is transmitted to the cylinder.

The steering device 220 includes, for example, a steering ECU and an electric motor. The electric motor applies a force to, for example, a rack and pinion mechanism to change a direction of a steering wheel. The steering ECU drives the electric motor to change the direction of the steering wheel in accordance with information input from the travel controller 141 or information input from the driving operator 80.

Figure 4:
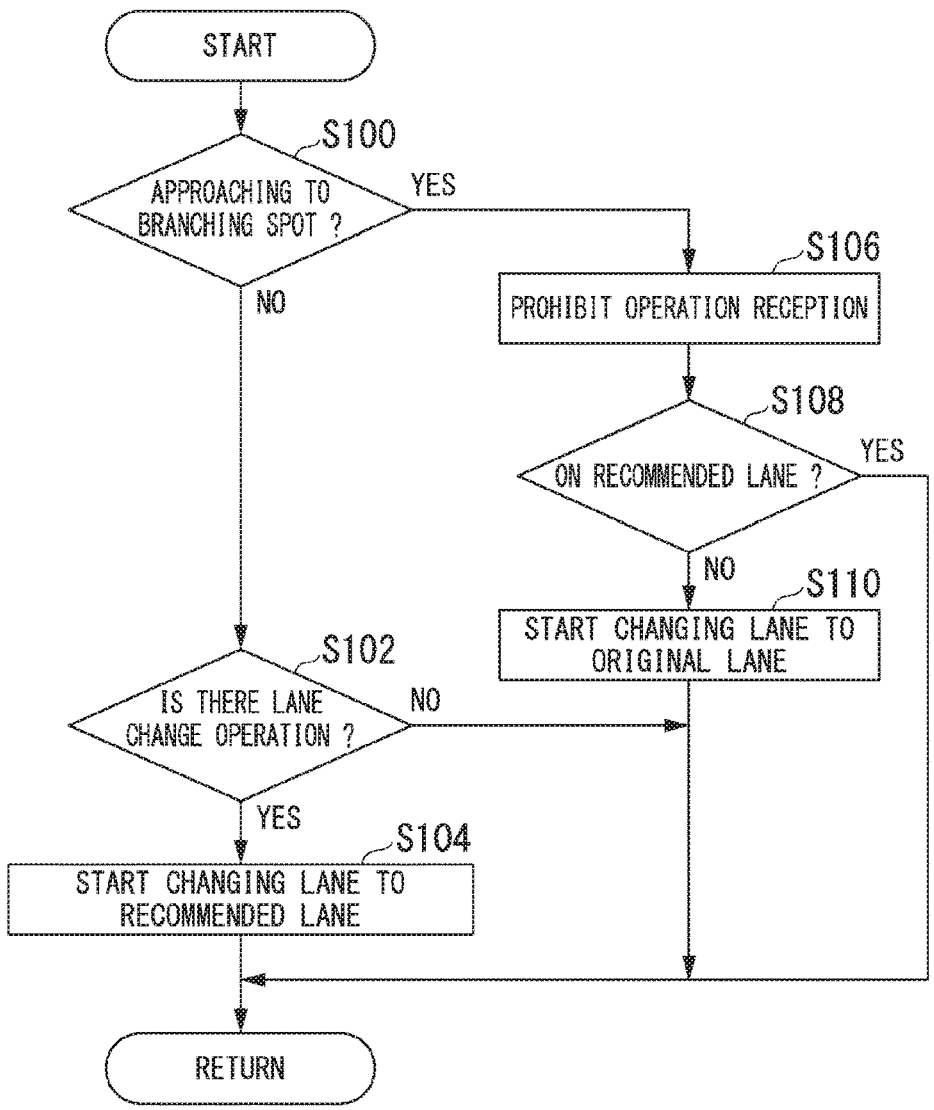
FIG. 4 is a flowchart showing an example of a process performed by an action plan generator 123 according to the first embodiment.

Hereinafter, a series of processes by the action plan generator 123 will be described with reference to the flowchart. FIG. 4 is a flowchart showing an example of a process performed by the action plan generator 123 according to the first embodiment. For example, the process of the flowchart is repeatedly performed at a predetermined period during automatic driving.

First, the action plan generator 123 determines whether the own vehicle M approaches a branching spot based on a relative positional relation between a position of the own vehicle M specified using some or all of the own vehicle position recognizer 122, the navigation device 50, and the INS and a recommended lane set by the recommended lane setter 61 (step S100). For example, "approaching the branching spot" means that the own vehicle M has come within a predetermined distance in front of a travel lane restriction section of the branching spot.

For example, when the position of the own vehicle M is out of the travel lane restriction section, that is, the own vehicle M does not approach the branching spot, the action plan generator 123 determines whether an instruction operation of changing lanes is received by the operation reception unit 32 (step S102).

For example, when the instruction operation to change lanes to the right adjacent lane is received by the operation reception unit 32, the action plan generator 123 changes the lane of the own vehicle M to a lane designated by the occupant by planning a lane change event in which the right adjacent lane is set as a lane change destination and generating a target trajectory in which the own vehicle arrives in the right adjacent lane (step S104).

Conversely, when the position of the own vehicle M is within the travel lane restriction section, that is, the own vehicle M approaches the branching spot, the action plan generator 123 prohibits reception of the lane change operation by the operation reception unit 32 (step S106) and determines whether the position of the own vehicle M is in the recommended lane of the travel lane restriction section (step S108). At this time, the action plan generator 123 may cause the display device 31 to display a prohibition notification screen for notifying that the lane change is prohibited in the travel lane prohibition section.

Figure 5:
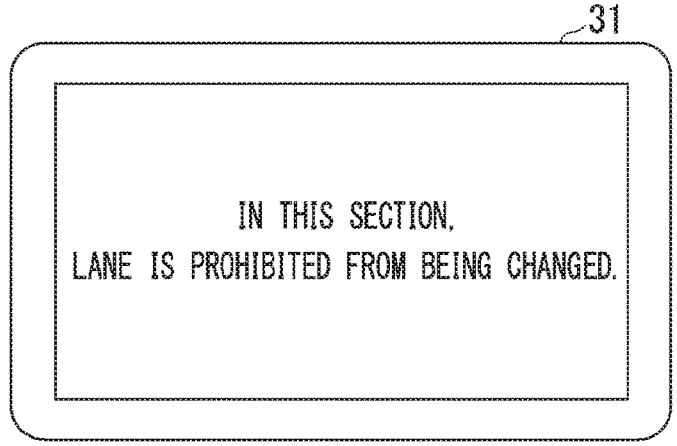
FIG. 5 is a diagram showing an example of a display device 31 in which a prohibition notification screen is displayed.

FIG. 5 is a diagram showing an example of the display device 31 in which a prohibition notification screen is displayed. As shown, the display device 31 displays, as the prohibition notification screen, the fact that a section in which the own vehicle M is traveling is a section in which a lane change is currently prohibited.

When the position of the own vehicle M is in the recommended lane of the travel lane restriction section, the process of the flowchart ends. Conversely, when the position of the own vehicle M is not in the recommended lane of the travel lane restriction section, the action plan generator 123 causes the own vehicle M to change its lane to the recommended lane by planning a lane change event in which the recommended lane is set as the lane change destination and generating a target trajectory in which the own vehicle M arrives in the recommended lane from the current traveling lane (step S110). Then, the process of the flowchart ends.

Figure 6:
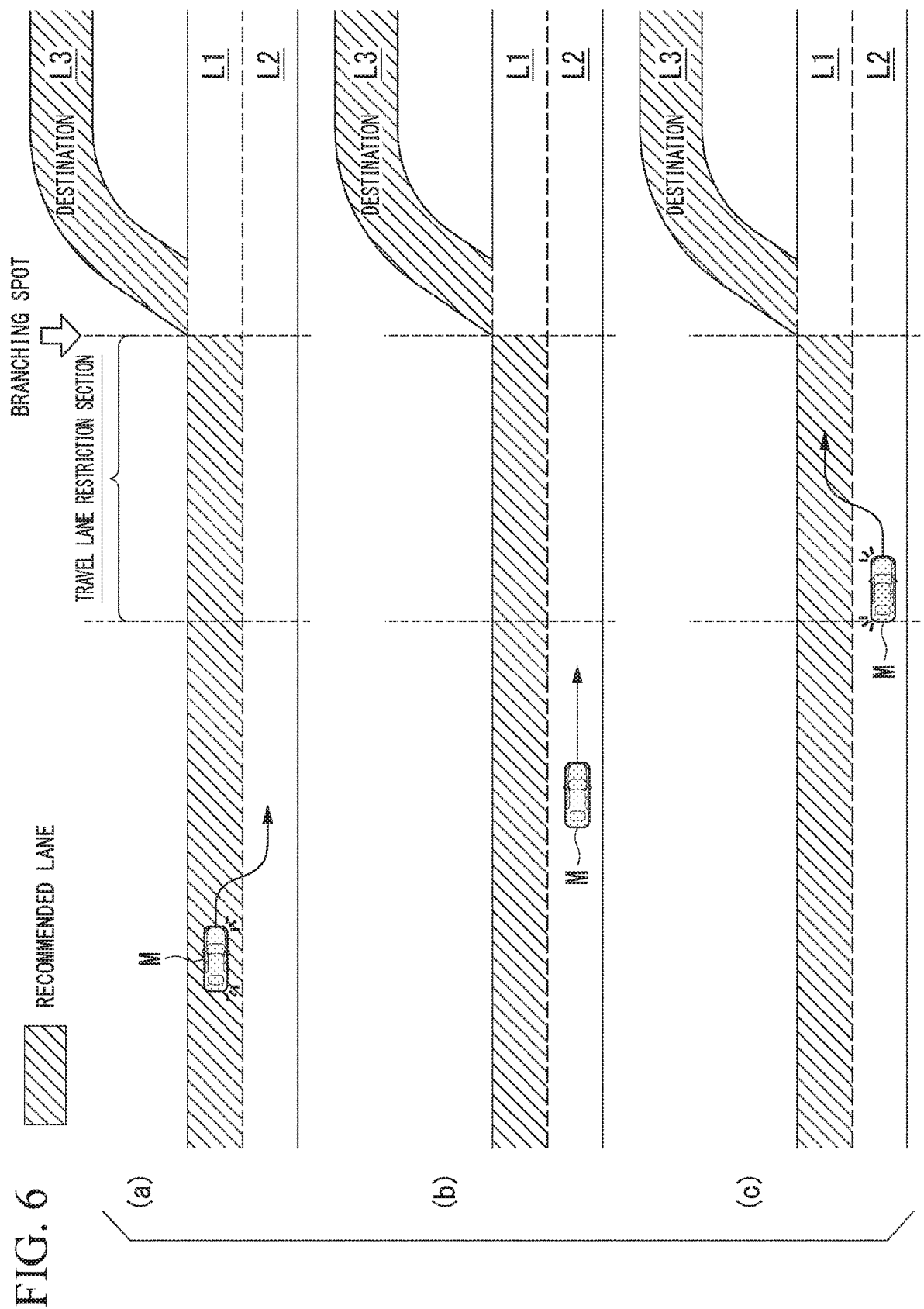
FIG. 6 is a diagram schematically showing an aspect in which the own vehicle M of which a lane has been changed through an operation by an occupant is returned to an original lane.

FIG. 6 is a diagram schematically showing an aspect in which the own vehicle M that has changed lanes through an operation by an occupant is returned to an original lane. In the drawing, L1 indicates a recommended lane, L2 indicates a passing lane adjacent to the recommended lane, and L3 indicates a branching lane.

For example, in (a) of the drawing, when an occupant of the own vehicle M operates the operation reception unit 32 to give an instruction to change its lane to the passing lane L2, the action plan generator 123 generates a target trajectory reaching from the recommended lane L1 to the passing lane L2. In response to this, the travel controller 141 controls the travel driving power output device 200, the brake device 210, and the steering device 220 such that the own vehicle M changes lanes to the passing lane L2.

As shown in (b) of the drawing, the own vehicle M arrives in the travel lane restriction section during continuous traveling in the passing lane L2 after the lane change in some cases. In such cases, as shown in (c) of the drawing, the action plan generator 123 generates a target trajectory reaching from the passing lane L2 to the recommended lane L1 which is the original lane before the lane change irrespective of whether an instruction operation to change lanes is given to the operation reception unit 32. In response to this, the travel controller 141 controls the travel driving power output device 200, the brake device 210, and the steering device 220 such that the own vehicle M changes lanes to the recommend lane L1.

In the above-described example, the recommended lane in the travel lane restriction section and the recommended lane in the section in front of the travel lane restriction section are set as the same lane, but the present invention is not limited thereto.

Figure 7:
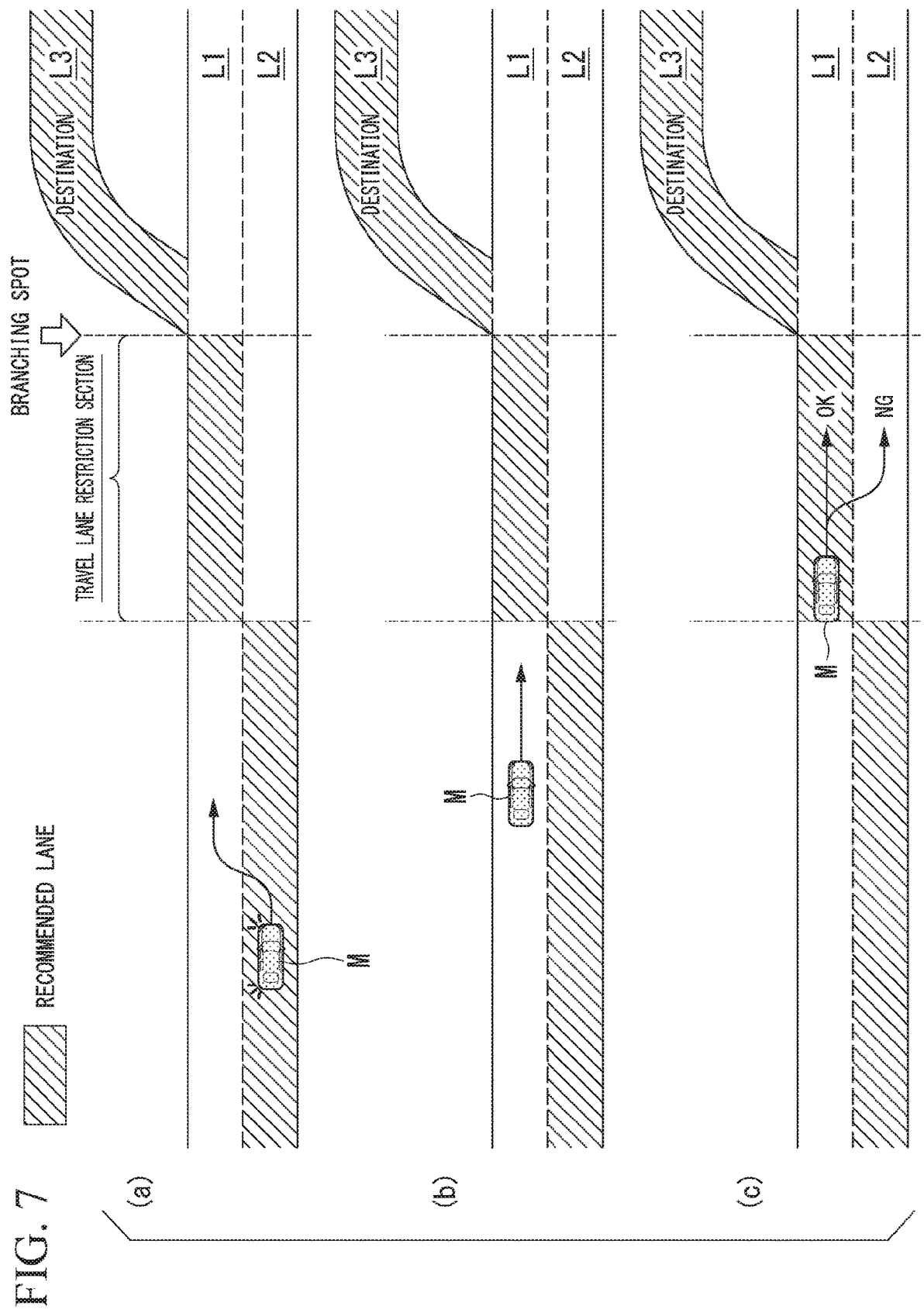
FIG. 7 is a diagram showing an example of a scenario in which a recommended lane of a travel lane restriction section and a recommended lane of another section are different.

FIG. 7 is a diagram showing an example of a scenario in which a recommended lane of a travel lane restriction section and a recommended lane of another section are different. In the shown example, in a section in front of the travel lane restriction section, the passing lane L2 is set as a recommended lane. As shown in (a) of the drawing, when an occupant of the own vehicle M operates the operation reception unit 32 to give an instruction to change its lane to the lane L1 while the own vehicle M is traveling in the passing lane L2 in a section in front of the travel lane restriction section, the action plan generator 123 generates a target trajectory reaching from the passing lane L2 to the lane L1. In response to this, the travel controller 141 controls the travel driving power output device 200, the brake device 210, and the steering device 220 such that the own vehicle M changes lanes to the lane L1.

As shown in (b) of the drawing, the own vehicle M arrives in the travel lane restriction section during continuous traveling in the lane L1 after the lane change in some cases. In the travel lane restriction section, since the lane L1 following a branching lane is set as a recommended lane, continuous traveling in the lane which is not the recommended lane in the current traveling section (the lane L1 in the example of the drawing) is reasonable. Accordingly, as shown in (c) of the drawing, the action plan generator 123 generates a target trajectory for continuously traveling in the current lane when the own vehicle M is traveling in the lane which is not the recommended lane in a section in front of the travel lane restriction section and the lane which is not the recommended lane is a recommended lane in the travel lane restriction section in which the own vehicle M is predicted to arrive in the future. In other words, the action plan generator 123 does not generate a trajectory for returning to the lane before the lane change when the own vehicle M is traveling in the same lane as the recommended lane in the travel lane restriction section in the future as a result of the lane change to another lane. For example, the action plan generator 123 causes the own vehicle M to continuously travel in the current lane by generating a target trajectory in which all the trajectory points at each sampling time are disposed in the current lane. Thus, changing lanes to return to the lane before the lane change is not performed. As a result, since the vehicle can move to the branching lane more reliably, the set route can be kept with higher precision.

In the above-described embodiment, when the own vehicle M arrives in the travel lane restriction section, the lane is changed to the original lane, as described above, but the present invention is not limited thereto. For example, when the occupant operates the operation reception unit 32 again to give an instruction to change lanes to the original lane, the action plan generator 123 may generate a target trajectory for changing lanes to the original lane even in the case in which it does not reach the travel lane restriction section.

According to the above-described first embodiment, the vehicle control system includes: the recommended lane setter 61 that sets a recommended lane in which the own vehicle M is to travel along a route to a destination, the operation reception unit 32 that receives an operation by an occupant of the own vehicle M, the action plan generator 123 that generates a target trajectory to travel in the recommended lane set by the recommended lane setter 61, and the travel controller 141 that controls steering and an acceleration or deceleration of the own vehicle M by controlling the travel driving power output device 200, the brake device 210, and the steering device 220 along the target trajectory generated by the action plan generator 123. The action plan generator 123 and the travel controller 141 can change lanes of the own vehicle M to another lane different from the recommended lane and smoothly control the steering and the acceleration or deceleration speed of the own vehicle M such that the traveling in a lane of a lane change destination is maintained until a predetermined condition is satisfied when the operation reception unit 32 receives an instruction operation to change lanes. Therefore, it is possible to smoothly control automatic driving after the lane change according to an instruction from an occupant. For example, the traveling continues in the lane of the lane change destination until the own vehicle M reaches a travel lane restriction section after the lane change according to the operation by the occupant. Therefore, it is possible to perform automatic driving conforming to an intention of the occupant. When the own vehicle M reaches the travel lane restriction section, the lane is changed to return to the recommended lane. Therefore, it is possible to guide the own vehicle M to the destination along a specific route.

Second Embodiment

Hereinafter, a second embodiment will be described. The second embodiment is different from the first embodiment in that when an occupant operates the operation reception unit 32 to give an instruction to change a lane in order to pass a preceding vehicle, the automatic driving controller 100 causes the own vehicle M to continuously travel in a lane of a lane change destination until the own vehicle M passes the preceding vehicle. Hereinafter, differences from the first embodiment will be mainly described and the description of functions or the like common to the first embodiment will be omitted.

Figure 8:
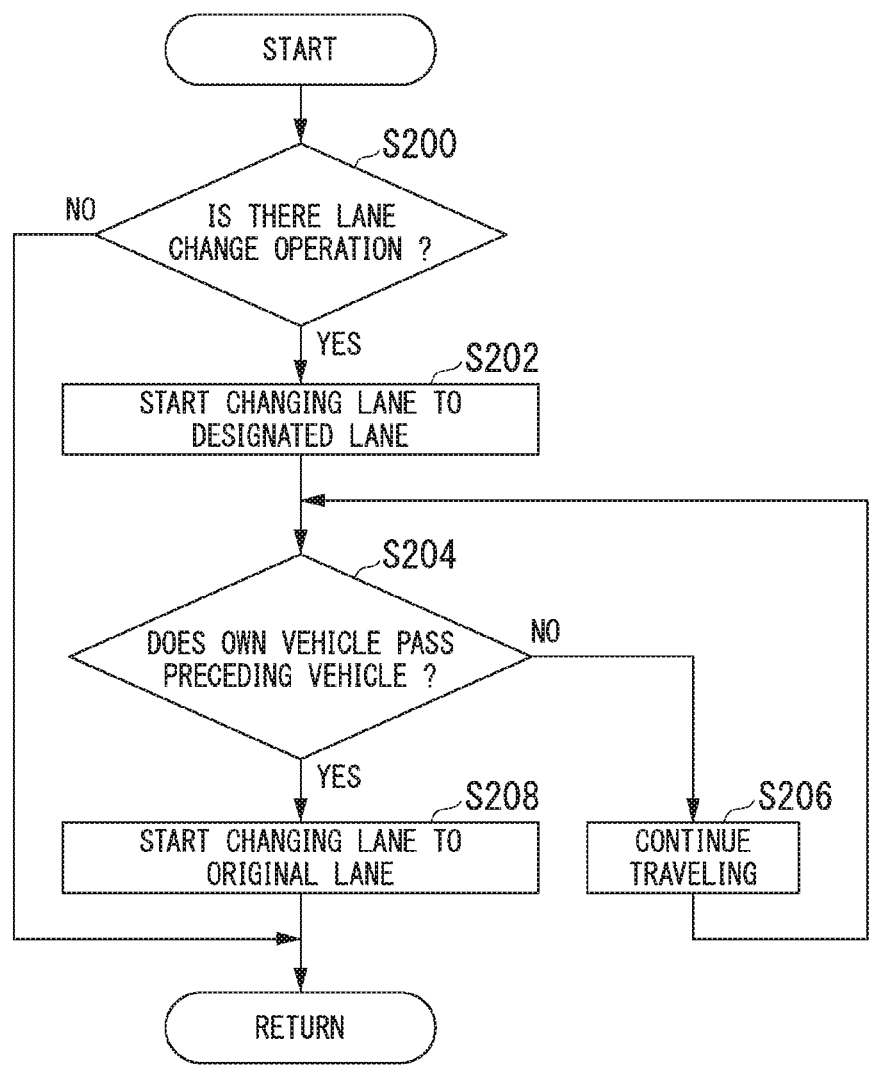
FIG. 8 is a flowchart showing an example of a process performed by an action plan generator 123 according to a second embodiment.

FIG. 8 is a flowchart showing an example of a process performed by the action plan generator 123 according to the second embodiment. For example, the process of the flowchart is repeatedly performed at a predetermined period during automatic driving.

First, the action plan generator 123 determines whether the operation reception unit 32 receives an instruction operation to change lanes (step S200). When the operation reception unit 32 does not receive the instruction operation to change lanes, the process of the flowchart ends.

Conversely, when the operation reception unit 32 receives the instruction operation to change lanes, the action plan generator 123 changes the lane of the own vehicle M to a lane designated by the occupant by planning a lane change event in which the instructed lane is set as a lane change destination and generating a target trajectory reaching from the own lane to the instructed lane (step S202).

Subsequently, the action plan generator 123 determines whether the own vehicle M passes the preceding vehicle among peripheral vehicles recognized by the external-world recognizer 121 in the lane of the lane change destination (step S204).

When the own vehicle M does not pass the preceding vehicle, the action plan generator 123 continues traveling in the lane of the lane change destination by continuously generating a target trajectory for continuously traveling in the lane of the lane change destination until the own vehicle M passes the preceding vehicle (step S206). For example, the action plan generator 123 generates the target trajectory for gradually accelerating the own vehicle M to exceed a speed of the preceding vehicle.

Conversely, when the own vehicle M passes the preceding vehicle, the action plan generator 123 changes the lane of the own vehicle M to the original lane by generating a target trajectory reaching from the lane of the lane change destination to the lane before the lane change (step S208). Thus, the process of the flow ends.

Figure 9:
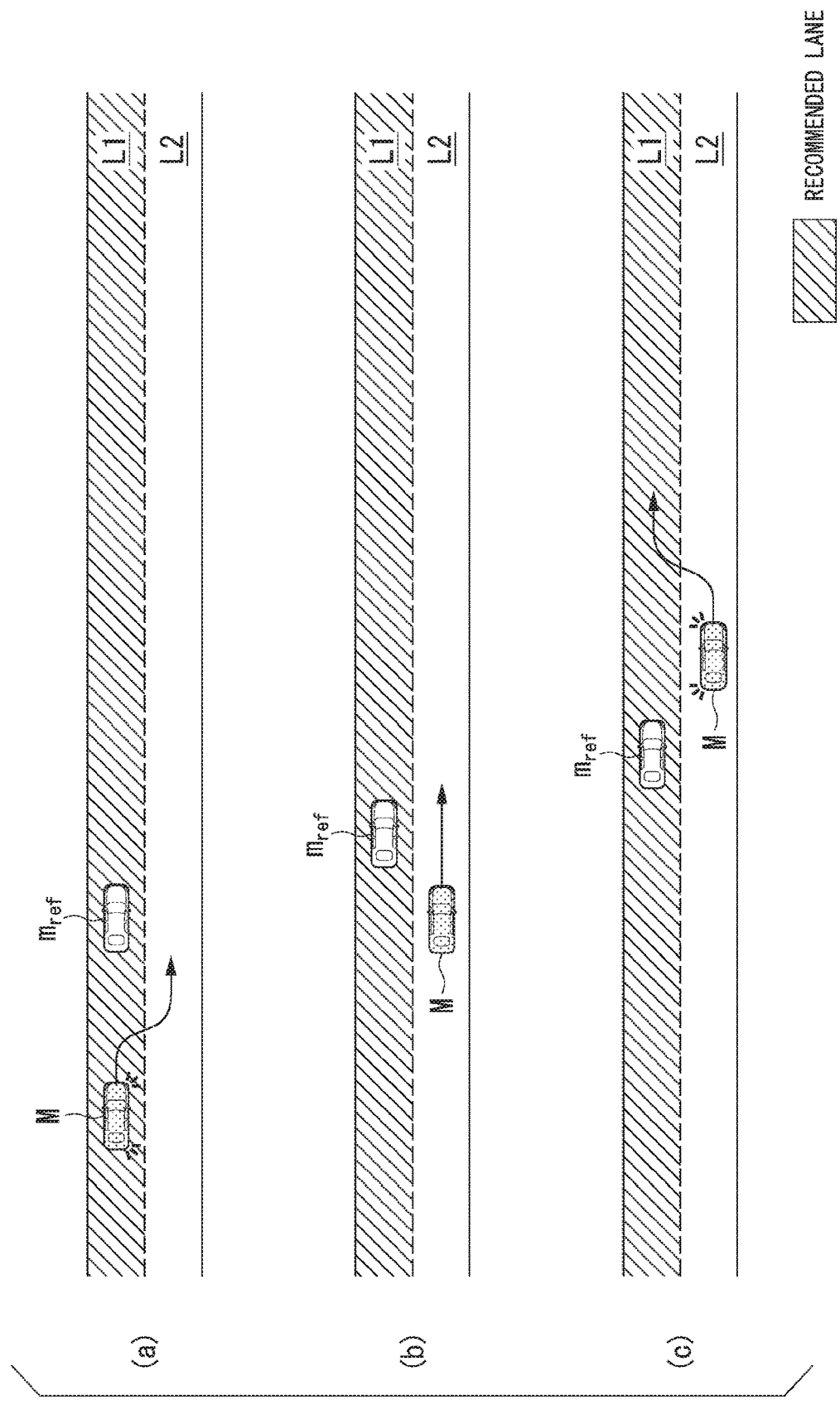
FIG. 9 is a diagram schematically showing an aspect in which the own vehicle M of which a lane has been changed in order to pass a preceding vehicle is returned to an original lane.

FIG. 9 is a diagram schematically showing an aspect in which the own vehicle M of which a lane has been changed in order to pass a preceding vehicle is returned to an original lane. In the drawing, $m_{ref}$ indicates a preceding vehicle. For example, as shown in (a) of the drawing, when the occupant operates the operation reception unit 32 to give an instruction to change a lane to the lane L2 in a situation in which there is the preceding vehicle $m_{ref}$, the action plan generator 123 generates a target trajectory reaching from the recommended lane L1 to the lane L2. In response to this, the travel controller 141 controls the travel driving power output device 200, the brake device 210, and the steering device 220 to change lanes of the own vehicle M to the lane L2.

As shown in (b) of the drawing, the action plan generator 123 generates, for example, a target trajectory for accelerating the own vehicle M to travel in the lane L2 until the own vehicle M passes the preceding vehicle $m_{ref}$ in the lane L2 of the lane change destination. Then, as shown in (c) of the drawing, when the own vehicle M passes the preceding vehicle $m_{ref}$, the action plan generator 123 generates a target trajectory reaching from the current lane L2 to the recommended lane L1 before the lane change. In response to this, the travel controller 141 controls the travel driving power output device 200, the brake device 210, and the steering device 220 to change lanes of the own vehicle M to the recommended lane L1.

According to the above-described second embodiment, when the occupant gives an instruction to change lanes in order to pass the preceding vehicle, the own vehicle M returns to the recommended lane before the lane change from the lane of the lane change destination at a timing at which the own vehicle passes the preceding vehicle. Therefore, it is possible to control the automatic driving more smoothly after the lane change according to the instruction from the occupant.

In the above-described second embodiment, the number of passing target vehicles is 1, as described above, but the present invention is not limited thereto. For example, when there are a plurality of preceding vehicles $m_{ref}$ and the vehicles form a line, the action plan generator 123 may generate a target trajectory for returning to the original vehicle at a time point at which the own vehicle M has passed all the vehicles in the line.

When the own vehicle M avoids an obstacle such as a falling object or avoids a road construction spot instead of changing a lane at the time of passing the preceding vehicle $m_{ref}$, the process of the embodiment may be applied to change a lane. For example, when the external-world recognizer 121 recognizes an obstacle in front of the own lane, the external-world recognizer 121 informs an occupant of the presence of the obstacle using the display device 31. In response to this, for example, when the occupant operates the operation reception unit 32 to give an instruction to change lanes in order to avoid the obstacle, the action plan generator 123 generates a target trajectory for evacuating the own vehicle M to an adjacent lane temporarily by generating a target trajectory reaching the adjacent lane on the instructed side. Then, when the own vehicle M has passed the obstacle in the adjacent lane of the evacuation destination, the action plan generator 123 returns the own vehicle M to the original lane by generating a target trajectory reaching from the adjacent lane to the lane before the lane change.

Third Embodiment

Hereinafter, a third embodiment will be described. The third embodiment is different from the first and second embodiments in that the lane of the own vehicle M is changed to the original lane based on a relative speed or a positional relation between the own vehicle M and a peripheral vehicle which is in the lane change destination. Hereinafter, differences from the first and second embodiments will be described mainly and the description of functions or the like common to the first and second embodiments will be omitted.

Figure 10:
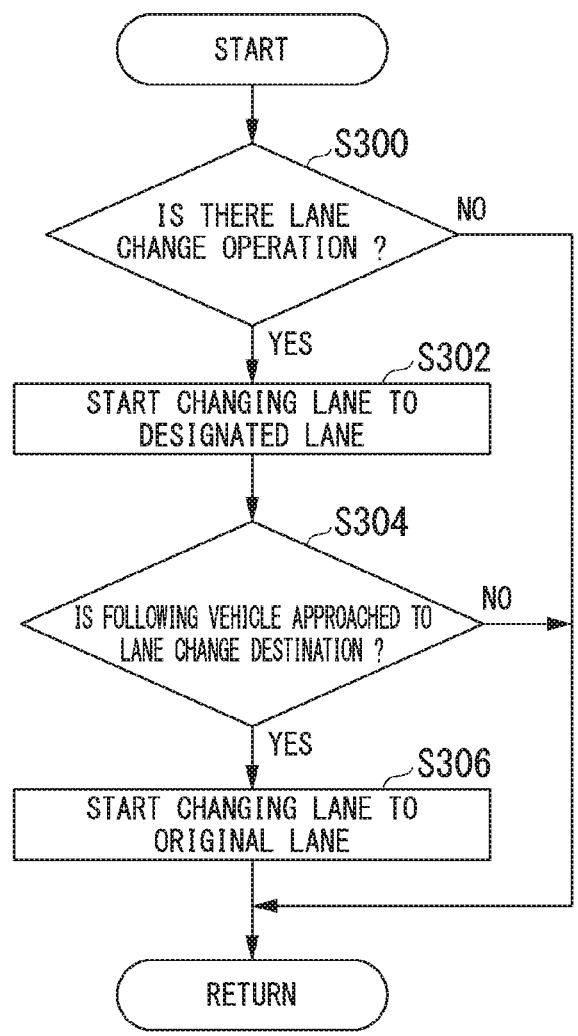
FIG. 10 is a flowchart showing an example of a process performed by an action plan generator 123 according to a third embodiment.

FIG. 10 is a flowchart showing an example of a process performed by the action plan generator 123 according to the third embodiment. For example, the process of the flowchart is repeatedly performed at a predetermined period during automatic driving.

First, the action plan generator 123 determines whether the operation reception unit 32 receives an instruction operation of changing lanes (step S300). When the operation reception unit 32 does not receive the instruction operation of changing lanes, the process of the flowchart ends.

Conversely, when the operation reception unit 32 receives the instruction operation of changing lanes, the action plan generator 123 changes the lane of the own vehicle M to a lane designated by the occupant by planning a lane change event in which the instructed lane is set as a lane change destination and generating a target trajectory reaching from the own lane to the instructed lane (step S302).

Subsequently, the action plan generator 123 determines whether a following vehicle approaches the own vehicle M as result of the lane change (step S304). The following vehicle is a peripheral vehicle which is behind the own vehicle M in the lane of the lane change destination of the own vehicle M among peripheral vehicles recognized by the external-world recognizer 121. For example, when a relative distance between the following vehicle and the own vehicle M is equal to or less than a threshold, the action plan generator 123 may determine that "the following vehicle approaches the own vehicle M." When a relative speed, a relative acceleration, or the like between the own vehicle M and the following vehicle is equal to or less than a threshold, the action plan generator 123 may determine that "the following vehicle approaches the own vehicle M."

When the following vehicle approaches the own vehicle M, the action plan generator 123 changes the lane of the own vehicle M to the original lane by generating the target trajectory reaching from the lane of the lane change destination to the lane before the lane change (step S306). Thus, the process of the flowchart ends.

According to the above-described third embodiment, the lane of the own vehicle M is changed to the original lane as a result of the lane change when the peripheral vehicle and the own vehicle M approach each other. Therefore, it is possible to change lanes in consideration of a peripheral vehicle.

Fourth Embodiment

Hereinafter, a fourth embodiment will be described. The fourth embodiment is different from the above-described first to third embodiments in that a timing of return to the original lane after the lane change through an operation by an occupant is different for each occupant getting on the own vehicle M. Hereinafter, differences from the first to third embodiments will be described mainly and the description of functions or the like common to the first to third embodiments will be omitted.

Figure 11:
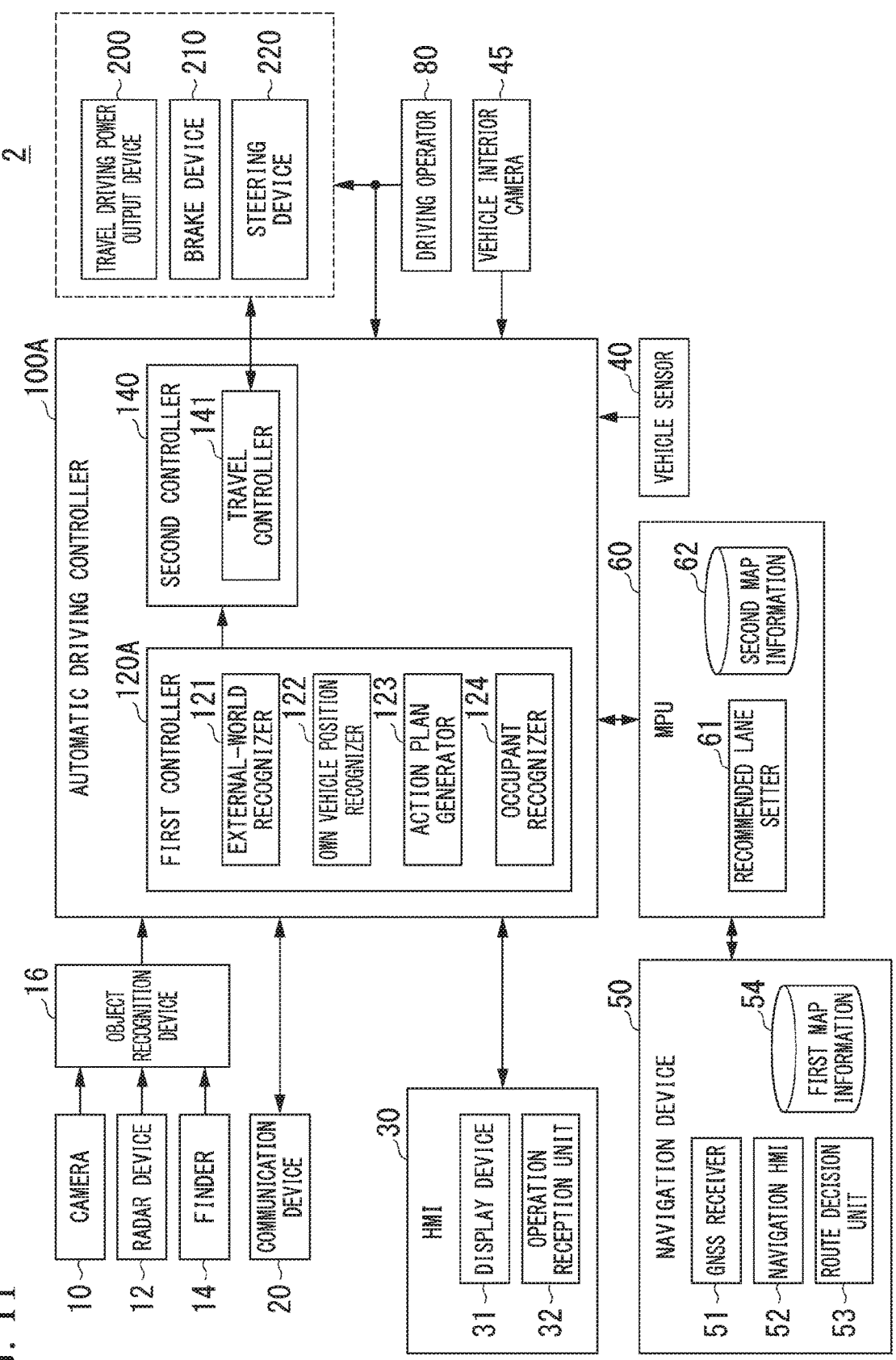
FIG. 11 is a diagram showing a configuration of a vehicle control system 2 according to a fourth embodiment.

FIG. 11 is a diagram showing a configuration of a vehicle control system 2 according to the fourth embodiment. In the vehicle control system 2 according to the fourth embodiment, a vehicle interior camera 45 is mounted in the own vehicle M.

The vehicle interior camera 45 images, for example, the upper part of an occupant sitting in a driving seat centering the face of the occupant. A captured image captured by the vehicle interior camera 45 is output to the automatic driving controller 100A.

The automatic driving controller 100A according to the fourth embodiment includes a first controller 120A and a second controller 140. The first controller 120A according to the fourth embodiment further includes an occupant recognizer 124 in addition to the external-world recognizer 121, the own vehicle position recognizer 122, and the action plan generator 123 described above.

For example, the occupant recognizer 124 recognizes an occupant sitting in a driving seat based on a captured image output by the vehicle interior camera 45.

The action plan generator 123 according to the fourth embodiment determines a timing of return to the original lane for each occupant recognized by the occupant recognizer 124.

Figures 12, 13:
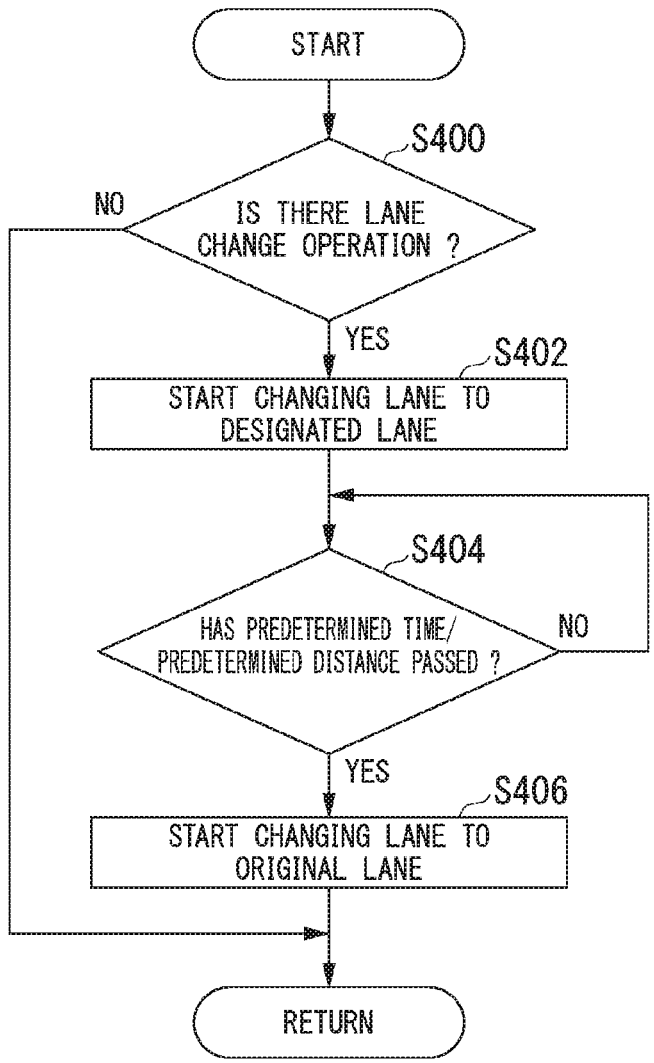
FIG. 12 is a flowchart showing an example of a process performed by an action plan generator 123 according to the fourth embodiment.
FIG. 13 is a diagram for describing a method of setting a predetermined time and a predetermined distance.

FIG. 12 is a flowchart showing an example of a process performed by the action plan generator 123 according to the fourth embodiment. For example, the process of the flowchart is repeatedly performed at a predetermined period during the automatic driving.

First, the action plan generator 123 determines whether the operation reception unit 32 receives an instruction operation of changing lanes (step S400). When the operation reception unit 32 does not receive the instruction operation of changing lanes, the process of the flowchart ends.

Conversely, when the operation reception unit 32 receives the instruction operation of changing lanes, the action plan generator 123 changes the lane of the own vehicle M to a lane designated by the occupant by planning a lane change event in which the instructed lane is set as a lane change destination and generating a target trajectory reaching from the own lane to the instructed lane (step S402).

Subsequently, the action plan generator 123 determines whether a predetermined time has passed or the own vehicle M has traveled by a predetermined distance after the lane change (step S404). The predetermined time and the predetermined distance may be set based on, for example, a frequency of the previous instruction operation of changing lanes by the occupant.

FIG. 13 is a diagram for describing a method of setting a predetermined time and a predetermined distance. For example, the action plan generator 123 counts a number of instruction operations of changing lanes on the operation reception unit 32 for each occupant recognized by the occupant recognizer 124 and sets a predetermined time or a predetermined distance for each occupant based on the counted number. As shown, for example, the action plan generator 123 sets the predetermined time and the predetermined distance to be longer for the occupant who has performed a larger number of instruction operations of changing lanes.

When the predetermined time has passed or the own vehicle M has traveled by the predetermined distance, the action plan generator 123 changes the lane of the own vehicle M to the original lane by generating a target trajectory reaching from the lane of the lane change destination to the lane before the lane change (step S406). Thus, the process of the flowchart ends.

According to the above-described fourth embodiment, after an operation by the occupant is received and the lane is changed, a timing of return to the original lane is decided based on a frequency of the instruction operation of changing lanes by the occupant. Therefore, for example, for an occupant who has changed a lane to an passing lane frequently in order to pass a vehicle, traveling in the passing lane can continue for a longer period. As a result, it is possible to control the automatic driving further smoothly after the lane change by an instruction from the occupant.

Fifth Embodiment

Hereinafter, a fifth embodiment will be described. The fifth embodiment is different from the first to fourth embodiments in that a route to a destination is changed when a lane is changed through an operation by an occupant. Hereinafter, differences from the first to fourth embodiments will be described mainly and the description of functions or the like common to the first to fourth embodiments will be omitted.

When the own vehicle M changes lanes to another lane which is not a recommended lane, the route decision unit 53 of the navigation device 50 according to the fifth embodiment determines whether the own vehicle continuously travels in the lane of the lane change destination and arrives at a destination. For example, when a spot A at which the own vehicle continuously travels in a recommended lane before the lane change and arrives and a spot B at which the own vehicle continuously travels in the lane of the lane change destination and arrives joins before the destination, the route decision unit 53 determines that the own vehicle can arrive at the destination even when the own vehicle continuously travels in the lane of the lane change destination. In this case, the route decision unit 53 decides a route to the destination input by the occupant again from the position of the own vehicle M specified by the GNSS receiver 51 at a time point at which the lane of the own vehicle M is changed to another lane which is not the recommended lane with reference to the first map information 54.

Then, the recommended lane setter 61 of the MPU 60 according to the fifth embodiment divides the route decided again by the route decision unit 53 into a plurality of blocks and sets a recommended lane in which the own vehicle M is to travel for each block with reference to the second map information 62.

FIG. 14 is a diagram showing an example of a scenario in which a route is changed. In the shown example, a branching lane L3 branched halfway in the lane L1 set as a recommended lane joins to the lane L1 before a destination. Therefore, when the lane is changed from the lane L1 to the lane L2 through an operation by an occupant as in the situation of (a) of the drawing, the route decision unit 53 decides a route to the destination again at a position of the own vehicle M at a time point at which the lane is changed as in (b) of the drawing. At this time, the recommended lane setter 61 may set a lane (the lane L2 of the lane change destination) in which the own vehicle M travels as a recommended lane in the route decided again. A section before an entry to a curve road may be handled as a travel lane restriction section.

According to the above-described fifth embodiment, when the lane is changed to a lane different from a recommended lane through an instruction operation of changing lanes by an occupant, a route to a destination is decided again as long as the own vehicle can arrive at the destination even in the traveling of the lane of the lane change destination. Therefore, it is possible to control automatic driving further smoothly after the lane is changed through an instruction from the occupant.

While preferred embodiments of the invention have been described and shown above, it should be understood that these are exemplary examples of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

REFERENCE SIGNS LIST

1 Vehicle control system
10 Camera
12 Radar device
14 Finder
16 Object recognition device
20 Communication device
30 HMI
31 Display device
32 Operation reception unit
40 Vehicle sensor
45 Vehicle interior camera
50 Navigation device
51 GNSS receiver
52 Navigation HMI
53 Route decision unit
54 First map information
60 MPU
61 Recommended lane setter
62 Second map information
80 Driving operator
100 Automatic driving controller
120 First controller
121 External-world recognizer
122 Own vehicle position recognizer
123 Action plan generator
124 Occupant recognizer
140 Second controller
141 Travel controller
200 Travel driving force output device
210 Brake device
220 Steering device

What is claim is:

1. A vehicle control system comprising:
a processor that executes instructions to:
receive an operation by an occupant of an own vehicle;
set a recommended lane in which the own vehicle is to travel along a route to a destination,
control steering and acceleration or deceleration of the own vehicle such that the own vehicle travels in the recommended lane,
in response to receiving a predetermined operation in another section that differs from a section which is a predetermined distance in front of a branching spot in which a branching lane branches from a main lane under a condition that the recommended lane is set in the branch lane, causing the own vehicle in the recommended lane to change from the recommended lane to another lane different from the recommended lane and controlling the steering and the acceleration or deceleration speed of the own vehicle such that the traveling the another lane is maintained until the own vehicle arrives in the section, and
in response to receiving the predetermined operation in the section under the condition that the recommended lane is set in the branch lane, not causing the own vehicle in the recommended lane to change from the recommended lane to the another lane.

2. The vehicle control system according to claim 1, wherein the processor further executes instructions to: control the steering and the acceleration or deceleration speed of the own vehicle such that the traveling in the another lane is maintained until the own vehicle that changed lanes to the another lane passes a preceding vehicle on the recommended lane.

3. The vehicle control system according to claim 1, wherein the processor further executes instructions to: control the steering and the acceleration or deceleration speed of the own vehicle such that the traveling in the another lane is maintained until the own vehicle that changed lanes to the another lane passes an obstacle on the recommended lane.

4. The vehicle control system according to claim 1, wherein the processor further executes instructions to: control the steering and the acceleration or deceleration speed of the own vehicle such that the traveling in the another lane is maintained until a following vehicle behind the own vehicle on the another lane relatively approaches the own vehicle.

5. The vehicle control system according to claim 1, wherein the processor further executes instructions to: control the steering and the acceleration or deceleration speed of the own vehicle such that the traveling in the another lane is maintained until the processor receives the predetermined operation.

6. The vehicle control system according to claim 1,
wherein the processor further executes instructions to: set a lane following the branching lane as the recommended lane among lanes of the main lane in the section, and
does not change a lane to return to the lane before the lane change when the own vehicle travels in the same lane as the recommended lane in the section in the future as a result of the lane change to the another lane.

7. The vehicle control system according to claim 1, wherein the processor further executes instructions to:
recognize an occupant of the own vehicle,
continue the control of the steering and the acceleration or deceleration of the own vehicle such that the own vehicle travels in the another lane until a time provided by the occupant passes or until the own vehicle travels a distance provided by the occupant after the lane change to the another lane, and
after the time or the distance passes, the lane of the own vehicle is changed from the another lane to the lane before the lane change.

8. A vehicle control system comprising:
a processor that executes instructions to:
set a recommended lane in which an own vehicle is to travel along a route to a destination acquired by the acquirer;
receive an operation by an occupant of an own vehicle;
acquire a route to a destination,
set a recommended lane in which the own vehicle is to travel along the route,
control steering and acceleration or deceleration of the own vehicle such that the own vehicle travels in the recommended lane,
in response to receiving a predetermined operation in another section that differs from a section which is a predetermined distance in front of a branching spot in which a branching lane branches from a main lane under a condition that the recommended lane is set in the branch lane, causing the own vehicle in the recommended lane to change from the recommended lane to another lane different from the recommended lane and controlling the steering and the acceleration or deceleration speed of the own vehicle such that the traveling in the another lane is maintained until the own vehicle arrives in the section,
in response to receiving the predetermined operation in the section under the condition that the recommended lane is set in the branch lane, not causing the own vehicle in the recommended lane to change from the recommended lane to the another lane, and
re-acquire the route as the lane of the own vehicle is changed.

9. A vehicle control method causing an on-board computer mounted in an own vehicle including a processor configured to receive an operation by an occupant of the own vehicle to perform to perform:
setting a recommended lane in which the own vehicle is to travel along a route to a destination;
in response to receiving a predetermined operation in another section that differs from a section which is a predetermined distance in front of a branching spot in which a branching lane branches from a main lane under a condition that the recommended lane is set in the branch lane, causing the own vehicle in the recommended lane to change from the recommended lane to another lane different from the recommended lane and controlling the steering and the acceleration or deceleration speed of the own vehicle such that the traveling in the another lane is maintained until the own vehicle arrives in the section, and
in response to receiving the predetermined operation in the section under the condition that the recommended lane is set in the branch lane, not causing the own vehicle in the recommended lane to change from the recommended lane to the another lane.

10. A computer-readable non-transitory storage medium storing a vehicle control program causing an on-board computer mounted in an own vehicle including a processor configured to receive an operation by an occupant of the own vehicle to perform:
setting a recommended lane in which the own vehicle is to travel along a route to a destination;
in response to receiving a predetermined operation in another section that differs from a section which is a predetermined distance in front of a branching spot in which a branching lane branches from a main lane under a condition that the recommended lane is set in the branch lane, causing the own vehicle in the recommended lane to change from the recommended lane to another lane different from the recommended lane and controlling the steering and the acceleration or deceleration speed of the own vehicle such that the traveling in the another lane is maintained until the own vehicle arrives in the section, and
in response to receiving the predetermined operation in the section under the condition that the recommended lane is set in the branch lane, not causing the own vehicle in the recommended lane to change from the recommended lane to the another lane.

* * * * *